United States Patent [19]

Hatano

[11] Patent Number: 5,111,243
[45] Date of Patent: May 5, 1992

[54] APPARATUS AND METHOD FOR ADJUSTING IMAGE CONTRAST ON A DISPLAY DEVICE

[75] Inventor: Mitsuru Hatano, Tokyo, Japan

[73] Assignee: Kabushiki Kaisha Toshiba, Kawasaki, Japan

[21] Appl. No.: 554,336

[22] Filed: Jul. 19, 1990

[30] Foreign Application Priority Data

Jul. 19, 1989 [JP] Japan .................... 1-184822

[51] Int. Cl.⁵ .................... G03G 21/00
[52] U.S. Cl. .................... 355/209; 340/767
[58] Field of Search ............ 355/209, 206, 200, 204; 340/765, 767, 784, 793; 358/10, 139

[56] References Cited

U.S. PATENT DOCUMENTS

| | | | |
|---|---|---|---|
| 4,297,691 | 10/1981 | Kodama et al. | 340/793 X |
| 4,319,237 | 3/1982 | Matsuo et al. | 340/784 X |
| 4,475,806 | 10/1984 | Daughton et al. | 340/784 X |
| 4,514,727 | 4/1985 | Van Antwerp | 340/793 |
| 4,764,766 | 8/1988 | Aoyama et al. | 340/784 |
| 4,975,734 | 12/1990 | Mishima | 355/70 |

Primary Examiner—A. T. Grimley
Assistant Examiner—Christopher Horgan
Attorney, Agent, or Firm—Foley & Lardner

[57] ABSTRACT

An apparatus for adjusting the image contrast of a display device, which includes a memory storing first data representing a predetermined image contrast, a driver for driving the display device, an input device for inputting second data representing the image contrast different from the predetermined one, a data-rewriting device for supplying the first data read from the memory and the second data input from the input device to the second data in the memory. In use, the apparatus is be incorporated within an apparatus having the display device, such as a copying machine. The input device is part of the console panel unit mounted on the outer side of the copying machine. The display device displays both the first data and the second data.

9 Claims, 5 Drawing Sheets

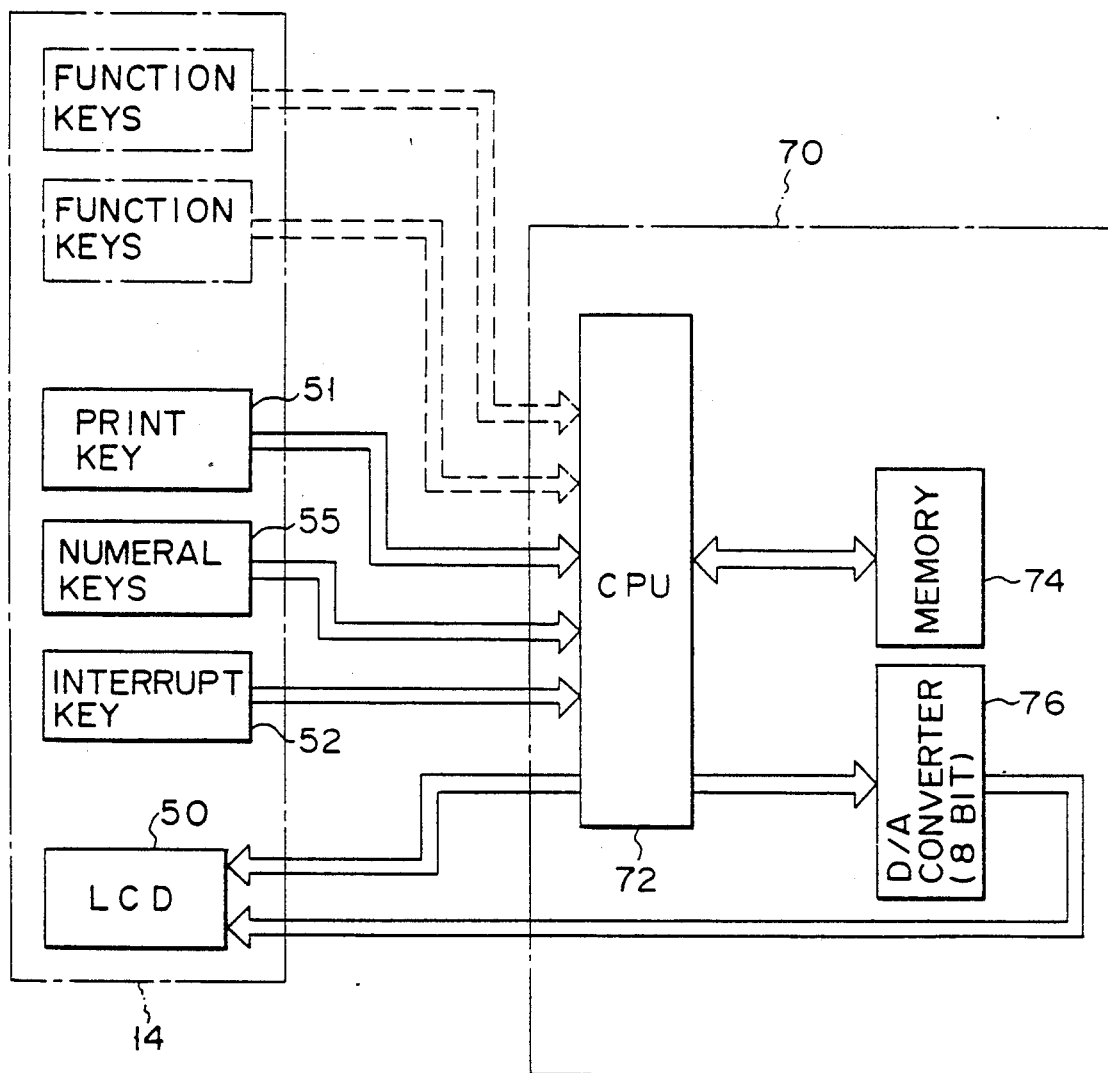
F I G. 3

APPARATUS AND METHOD FOR ADJUSTING IMAGE CONTRAST ON A DISPLAY DEVICE

BACKGROUND OF THE INVENTION

1. Field of the Invention

The present invention relates to an apparatus and method for adjusting the image contrast of a display device, and more particularly, to an apparatus and method for adjusting the image contrast of the display device which is incorporated in the console panel unit of a copying machine or a facsimile device.

2. Description of the Related Art

Various apparatuses have a console panel unit. Among these apparatuses are: an image processor for processing image information, e.g., characters and graphics; an image scanner for reading image information from an original and supplying this information to an image processor; a printer for printing image data output from a computer or the like, on a recording medium; a copying machine for copying an original having image information, and a facsimile device for transmitting and receiving image information though a communication line. A display device is incorporated in the console panel unit of each of these apparatuses, for displaying messages showing the conditions of some of the components of the apparatus and the instructions as to operate the apparatus.

It is desirable that the display device incorporated in the console panel unit of, for example, a copying machine which performs an electrophotography process, should display as many characters, symbols, and graphic characters as is possible. Further, it is demanded that the display device should display as many messages as is possible, since the apparatus has many functions to perform and is required to carry out these functions in complex combinations. To display many characters, symbols, graphic characters, and messages, the display device used in the copying machine or the like is large in size.

Display devices of various types are known which can be used for the purpose described above. Among these are: a light-emitting diode display (hereinafter referred to as "LED display" which can display characters, graphics, and graphic characters; a cathoderay tube display (hereinafter referred to as "CRT display") which can display characters, graphics, and graphic characters, and a liquid crystal display (hereinafter referred to as "LCD" which ca display the same data items as the CRT display. The LED display cannot display as many characters and graphics as are desired. On the other hand, although the CRT display may display as many characters and graphics as is desired, it is considerably larger. The LCD is not as large as the CRT display but can display as many characters, graphics, and graphic characters as is desired, and is thus used commonly in console panel units. In particular, dot-matrix type LCDs, which have display elements arranged in rows and columns, are used in great numbers.

The LCDs available at present are classified into three types. The first is a positive type wherein some of the display elements become opaque when driven, thus defining characters, symbols, and graphic characters. The second is a negative type wherein some of the display elements become opaque when driven, whereby the remaining display elements define characters, symbols, and graphic characters. The third is a positive-negative type, which functions as a positive type when operated in the first operating mode and as a negative type when operated in the second mode. With most LCDs available now, it is possible to change the image contrast, that is, the ratio in brightness of the data items displayed to the background of the screen.

The image contrast of the LCD is adjusted before the copying machine is delivered from the factory. To be more specific, the drive voltage of the LCD, i.e., the voltage applied from a LCD drive circuit to the LCD is adjusted such that it has a value for which LCDs display images in the best contrast. As is generally known in the art, however, the image contrast of any LCD greatly varies in accordance with the direction in which light is externally applied to the LCD. Hence, the image contrast of the LCD must be readjusted in accordance with the intensity and direction of external light applied to the LCD after the copying machine has been installed in a specific room for use.

The variable resistor used for adjusting the drive voltage of the LCD is incorporated within the console panel unit, and cannot therefore be accessed from outside. In order to have access to the variable resistor, the cover concealing the variable resistor must be removed from the copying machine. After the variable resistor is adjusted, the cover must be attached to the copying machine. Removing and attaching the cover is time-consuming, and increases the chance of staining and damaging the cover. Furthermore, since the variable resistor must be adjusted, with the cover removed, while the power switch of the copying machine is on, the person who adjusts the variable resistor is exposed to the danger of electric shock.

SUMMARY OF THE INVENTION

An object of the present invention is to provide an apparatus and method for adjusting, with ease, the image contrast of a display device, or the ratio in brightness of the data items displayed to the background of the screen of the display device.

Another object of the invention is to provide an apparatus which can adjust the image contrast of a display device incorporated in a specific apparatus without removing covers from the specific apparatus.

Still another object of the invention is to provide a method of adjusting the image contrast of a display device to an optimal value, regardless of the direction in which light is applied to the display device, or regardless of the position of the person adjusting the image contrast.

According to a first aspect of this invention, there is provided an apparatus for adjusting an image brightness of a display device capable of displaying data of first and second brightness radios of what is displayed against a background thereof, the apparatus comprising means for energizing the display device which displays information, including the data, in a desired ratio, means for inputting further data for altering a present brightness ratio, and means for supplying the data representing the first brightness ratio and the second brightness ratio set by inputting means to the display device. The display device includes a first display section for displaying data, a second display section for displaying the first brightness ratio and a third display section for displaying the second brightness ratio.

According to a second aspect of the invention, there is provided a method of adjusting the image contrast in a display device using an apparatus which comprises means for storing first data representing a brightness ratio of the data displayed by the display device to the background of the screen of the display device; means for supplying drive signals to the display device in accordance with the first data read from the memory means; means for inputting second data different from the first data stored in the memory means; and means for supplying the first data stored in the memory means and the second data input from the input means, to the display device, and altering the drive signals in accordance with the second data, thereby to replacing the first data with the second data in the memory means, said method comprising the steps of: a) setting the apparatus to contrast-adjusting mode in response to a signal input from said input means; b) causing the display device to display the first data stored in the memory means; c) setting the apparatus to data-inputting mode; d) allowing the second data to be input from the input means; e) setting the apparatus to the contrast-adjusting mode; f) causing the display device to display the second data input from the input means, and altering the drive signals in accordance with the second data; g) replacing the first data by the second data in the memory means; and h) releasing the apparatus from the contrast-adjusting mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a block diagram illustrating the drive device used in the contrast adjusting apparatus, which is designed to drive the console panel unit electrically;

DETAILED DESCRIPTION OF THE PREFERRED EMBODIMENTS

Figure 1:
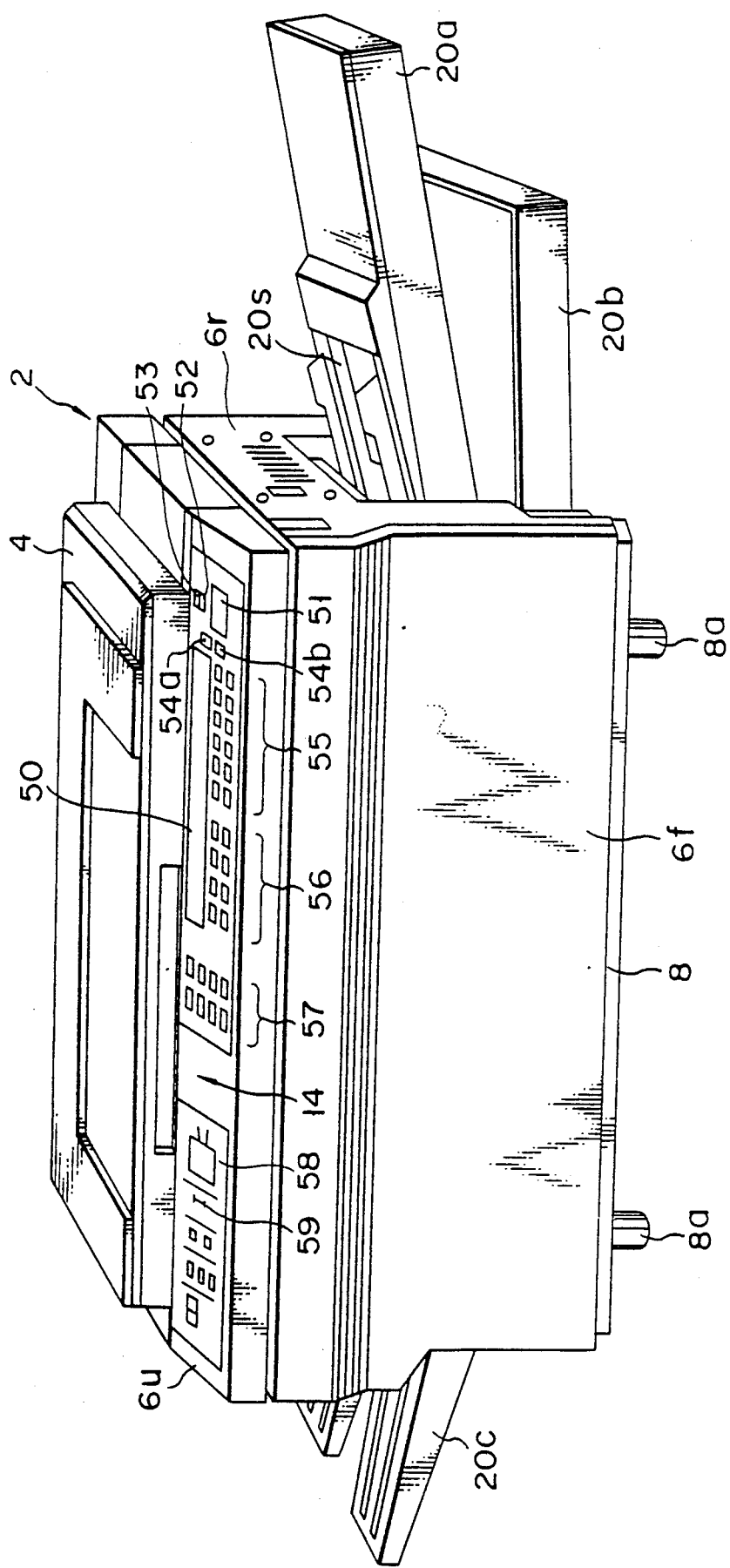
FIG. 1 is a perspective view showing a copying machine including a console panel unit having a display unit, and a contrast-adjusting apparatus according to this invention, which is designed to adjust the image contrast of the display device.

FIG. 1 shows a copying machine 2 having a housing 8 and legs 8a protruding from the bottom of the housing 8. The legs 8a are hard-rubber legs, lock bolts, or spacer bolts. An original table in located on the top of the housing 8 An original holder 4 is hinged to the original table, for holding an original placed on the original table.

Two cassettes 20a and 20b are removably inserted in the two slots in the right side of the housing 8, respectively. Either cassette contains a stack of sheets of paper on which images will be transferred from originals. A tray 20c is attached to the left side of the housing 8, for receiving copied sheets of recording paper. A front cover 6f, a rear cover (not shown), a right side cover 6r, and a left-side cover (not shown) are provided on the front, rear, right side, and left side of the housing 8, respectively. These covers can be opened to allow access into the interior of the housing 8. These covers and the top cover 6u are made of self-extinguishing resin. The housing 8 contains an image-forming section (not shown), a contrast-adjusting apparatus 70 (shown in FIG. 3), and some other components. The image forming section includes a latent image forming section for converting the information on a document into an electrostatic latent image, and an image transfer section for realizing the latent image and transferring the realized image to a sheet of paper.

An inner cover (not shown) is arranged within the housing 8, covering the image-forming section and preventing the user from touching the image-forming section. A part of the top surface of the housing 8 is a top cover 6u having a console panel unit 14. The LCD 50 is designed to display characters and graphics, indicating instruction messages and the conditions of some of the components of the machine 2. The console panel unit 14 has keys 51 to 59 to input operation commands and numerical data, etc.

Figure 5A:
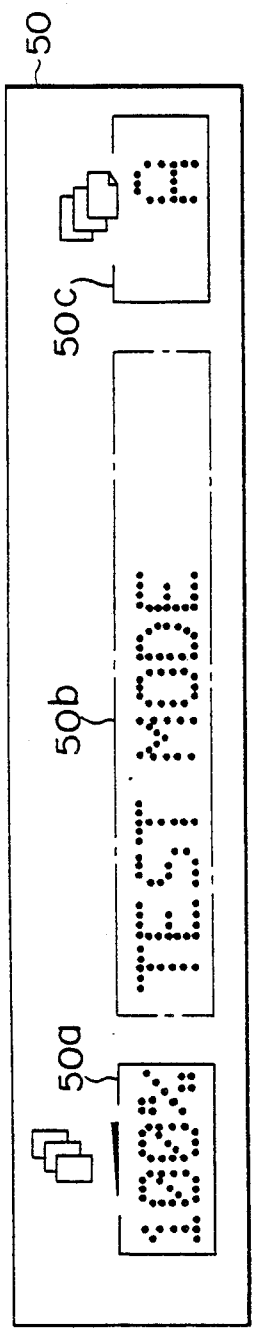
FIGS. 5A to 5C are plane views of the display device, explaining what data items the display device displays as the image contrast thereof is adjusted by the method explained by the flow chart of FIG. 4.
Figure 5B:
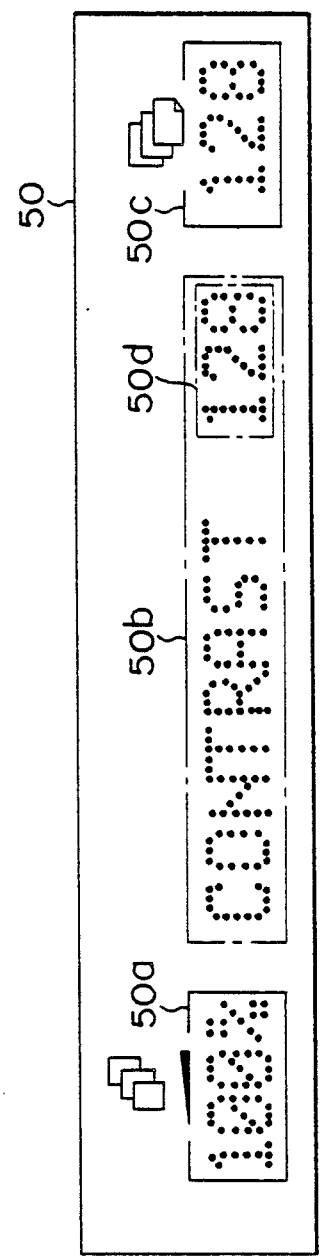
Figure 5C:
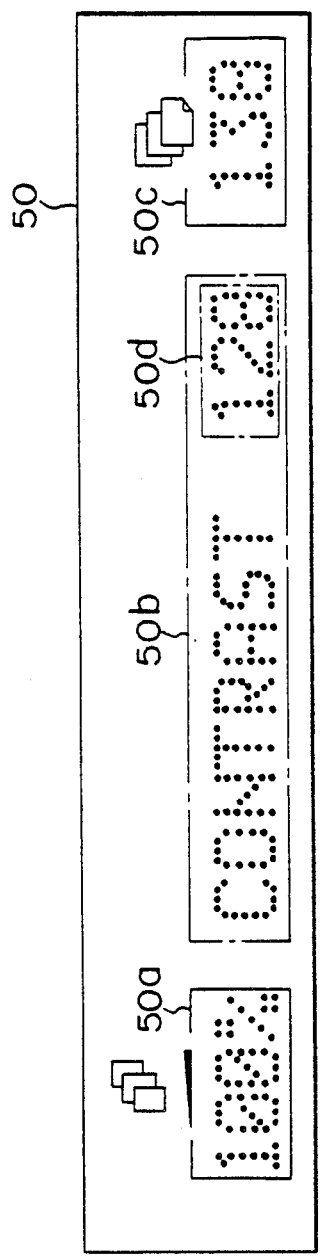

The console panel unit 14 will now be described in detail, with reference to FIG. 2. The unit 14 has a LCD 50 for displaying the conditions of some of the components located within the housing 8, instruction messages, for instance, "READY" or "PAPER JAM," and the like. The LCD 50 has a magnification-displaying section 50a, a message-displaying section 50b, and a data-displaying section 50c, as is best shown in FIGS. 5A, 5B, and 5C.

Figure 2:
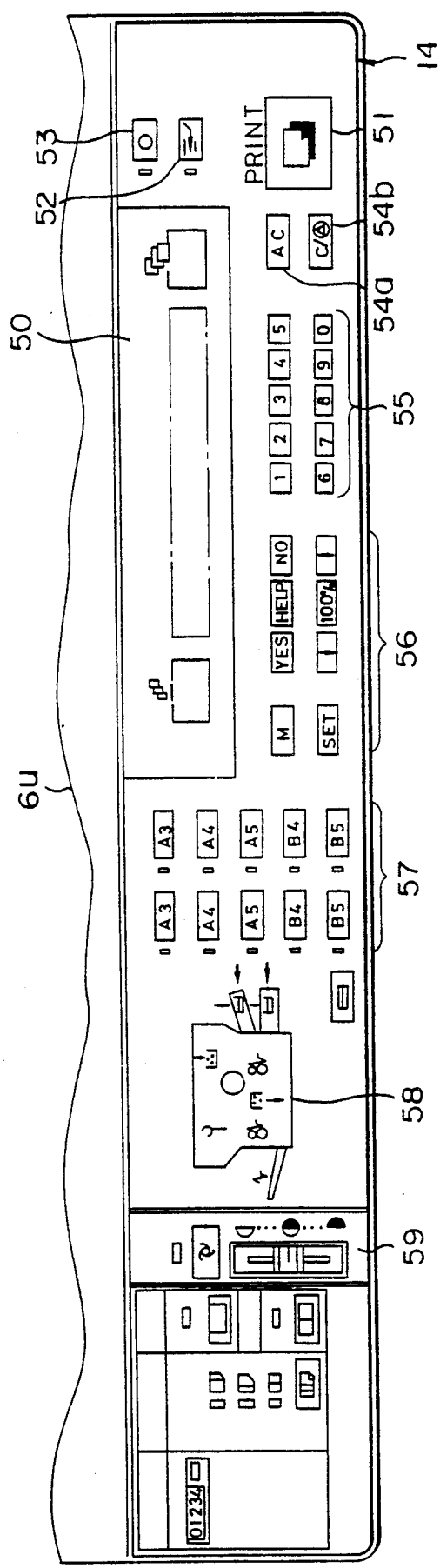
FIG. 2 is a plan view showing the console panel unit.

As is shown in FIG. 2, the console panel unit 14 also has a print key 51, an interrupt key 52, a energy saver key 53, an all-clear key 54a, a clear/stop key 54b, a group of numeral keys 55, and a group of magnification-setting keys 56. The print key 51 is depressed to cause the machine 2 to start copying an original. The interrupt key 52 is depressed to cause the machine 2 to stop the copying operation and start performing another operation. The energy saver key 53 is operated to set the machine 2 to energy-saving mode, or put the machine 2 in preheated condition. The all-clear key 54a is depressed to cancel all operation modes set in the copying machine 2, and set the machine 2 to predetermined initial operation modes. The clear/stop key 54b is pushed to clear numerical data items such as the desired number of copies and/or interrupt the operation the machine 2 is performing. The group of keys 55 has ten numeral keys "0" to "9" which are selectively pushed to enter numerical data such as the number of copies to make. The magnification-setting keys 56 are operated to input a desired value at which the image of the original will be enlarged or reduced.

The console panel unit 14 also includes a display section 57 for displaying the size of the original D and the size of the sheets P being used, an alarm display section 58 for displaying graphics instructing the user to replenish toner T and/or sheets P or informing the user of a trouble occurring within the housing 8, such as paper jamming, a copy-density setting switch 59 for adjusting the density in which the image on the original is to be copies, function keys, and a mechanical counter designed to count the copies made.

These keys, display sections, and other components of the console panel unit 14 are connected to the contrast-adjusting apparatus 70 which is contained in the housing 8.

As is illustrated in FIG. 3, the contrast-adjusting apparatus 70 has a nonvolatile memory 74, a D/A converter 76 for changing the voltage applied to the LCD 50, and a CPU 72 for supplying data to the memory 74 and receiving data therefrom, and for supplying data to the LCD 50 and the D/A converter 76.

A data-reading command signal is supplied from the console panel unit 14 to the CPU 72 when one key or several keys among the group of numeral keys 55 are depressed. In response to this command signal, the CPU 72 reads the data stored in the memory 74, and supplies this data (hereinafter referred to as "first data") to the LCD 50 and also to the A/D converter 76. The D/A converter 76 converts the first data into a first voltage. The first voltage is applied to the LCD 50, thus driving the LCD 50. Hence, the LCD 50 displays the first data in its first and second display sections, in the first contrast determined by the first voltage applied from the D/A converter 76.

When another one key or several keys among the group of numeral keys 55 are depressed, other data (hereinafter referred to as "second data") is input to the CPU 72. The CPU 72 supplies the second data to the LCD 50 and also to the D/A converter 76. The D/A converter 76 converts the second data into a second voltage, which is applied to the LCD 50. Hence, the LCD 50 displays the second data in its first display section in the second contrast determined by the second voltage, while it displays the first data in its second display section in the second contrast determined by the second voltage.

When still another one key or several keys among the group of numeral keys 55 are operated, thus inputting new data, this new data is supplied to the LCD 50 and the D/A converter 76 through the CPU 72, whereby the first display section of the LCD 50 displays the new data in the contrast determined by the new data, while the second display section displays the unrenewed data in the contrast determined by the new data.

On the other hand, when the interrupt key 52 is depressed, a data-renewing command signal is supplied to the CPU 72. In response to the data-renewing command signal, the CPU 72 erases the data stored in the memory 74 and write the new data thereinto. At the same time, the CPU 72 controls some components of the copying machine 2 other than the contrast-adjusting apparatus 70, thereby setting the machine 2 to ordinary operation mode.

Figure 4:
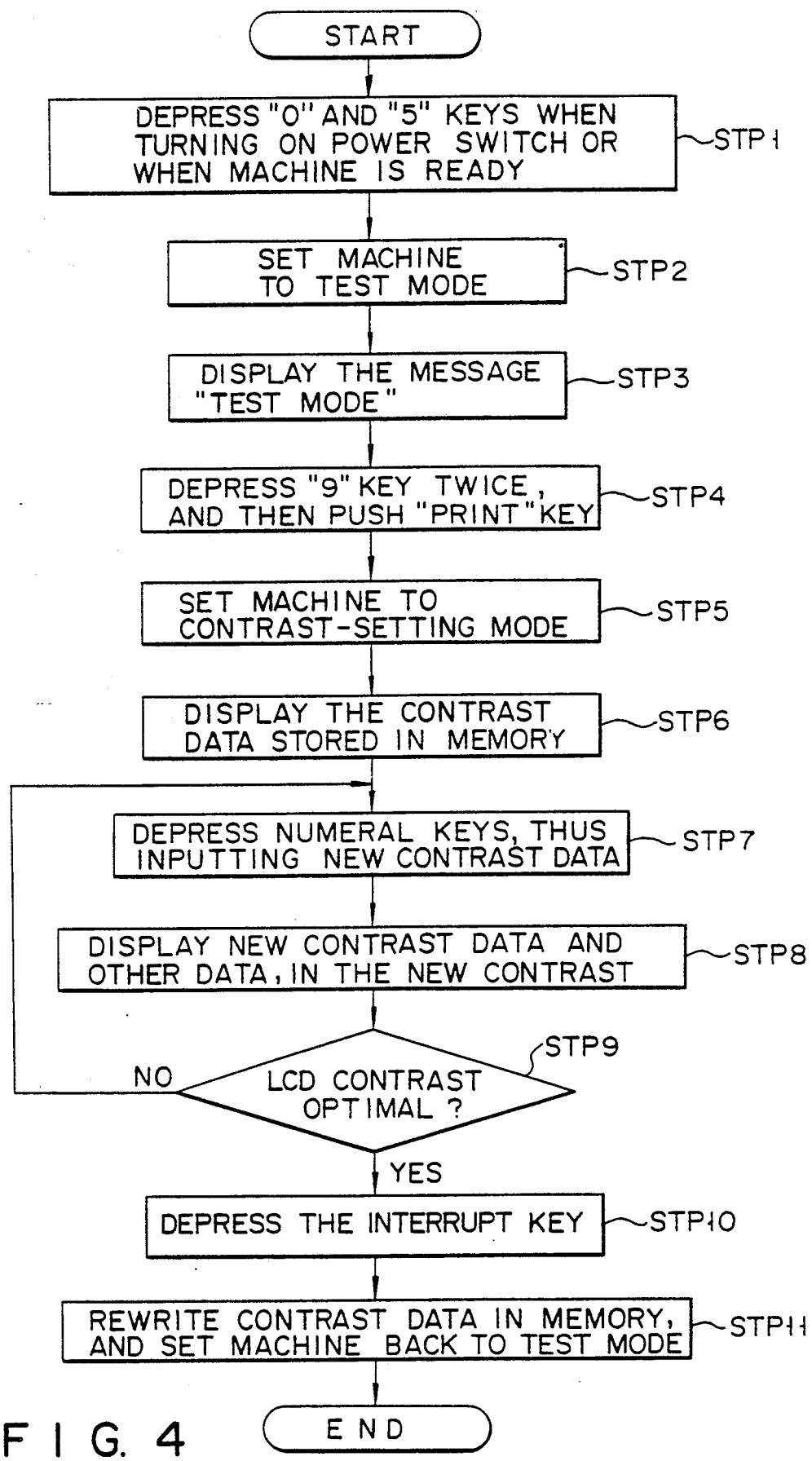
FIG. 4 is a flow chart explaining a method of adjusting the image contrast of the display device incorporated in the console panel unit.

A method of adjusting the contrast of the LCD 50 will now be explained, with reference to the flow chart of FIG. 4.

First, in step STP 1, the power switch of the copying machine 2, is turn on while at least two keys, e.g., the "0" and "5" keys of the numeral key group 55, are depressed simultaneously. Alternatively, the two keys are depressed simultaneously when the copying machine 2 remains in operable or ready condition. In step STP2, the CPU 72 outputs a test-mode signal in response to the signals representing "0" and "5" supplied from the numeral key group 55, and the parameters of some components of the machine 2, other than the contrast-adjusting apparatus 70, are renewed in accordance with the test-mode signal, whereby the copying machine 2 is set to test mode. At the same time, the CPU 72 supplies first display data to the LCD 50. In step STP 3, the LCD 50 displays the message "TEST MODE" in its message-display section 50b, the letter "A" in its data-display section 50c, as is illustrated in FIG. 5A.

Thereafter, in step STP4, the "9" key of the numeral key group 55 is depressed twice, thereby inputting a contrast-setting code, and then the print key 51 is depressed, thus inputting a code entry signal. Then, the flow goes to step STP5, in which the CPU 72 generates a contrast setting signal in response to the contrast-setting code and the code entry signal. As a result of this, the copying machine 2 is set to contrast-setting mode. Then, in step STP6, the CPU 72 supplies second display data to the LCD 50, whereby the LCD 50 displays the message "CONTRAST" in its message-display section 50b, as is showing FIG. 5B. Simultaneously, the LCD 50 displays the contrast data stored in the memory 74, e.g., "128", in its data-display section 50c, and also in a part 50d of the message-display section 50b, also as is illustrated in FIG. 5B.

Here, it will be described the relationship between the data stored in the memory 74 and the voltage applied to the LCD 50 from the D/A converter 76. The D/A converter 76 divides the voltage applied from a power supply (not shown) into $2^n$ parts, where n is the bit-configuration of the D/A converter 76. If the D/A converter 76 is of 8-bit configuration, it divides the voltage into 256 parts ($=2^8$). The D/A converter 74 thereby converts the input voltage to a voltage determined by the contrast data stored in the memory 74. Let us assume that the maximum voltage applied to the D/A converter 76 is 5 V, and that the contrast data stored in the memory 74 is "128" which is the intermediate of the value of "256", i.e., the number of parts into which the power supply voltage is divided by means of the D/A converter 76. Then, the output voltage of the D/A converter 76 is:

$$5 \text{ V} \times 128/256 = 2.5 \text{ V}$$

Whenever the power switch of the copying machine 2 is turned on for the first time after the machine 2 has been assembled, the numerical value of "128" is read out from the memory 74 and is then displayed by the LCD 50. In other words, the LCD 50 displays the contrast data which stored in the memory 74 and corresponds to the output voltage of the D/A converter 76.

In step STP 7, if the contrast data "128" displayed in the data-displaying section 50c is too low, keys of the numeral key group 55 are depressed for inputting a numerical value greater than "128," i.e., new contrast data. Conversely, if the contrast is too high, some keys of the numeral key group 55 are depressed, thus inputting a numerical value less than "128," or new contrast data. Let us assume that the contrast is too low, and that the "1", "3" and "8" keys of the key group 55, are depressed for inputting new contrast data "138."

The flow then goes to step STP 8, in which the following operations are performed. First, the new contrast data, i.e., "138", is supplied to the CPU 72, which supplies the new contrast data to the LCD 50 and the D/A converter 76. Then, the D/A converter 76 converts the new contrast data into a voltage, i.e., about 2.7 V ($\approx 5 \text{ V} \times 138/256$). Next, the voltage of about 2.7 V is applied to the LCD 50. Hence, the LCD 50 displays, as is illustrated in FIG. 5C, the new contrast data "138" in the data-displaying section 50c in a contrast determined by the new contrast data "138". In other words, the contrast data displayed in the data-display section 50c is changed from "128" to "138," whereas the message "CONTRAST" is still displayed in the message-displaying section 50b.

The flow advances to step STP9, in which the user determines whether or not the new contrast is the best possible. If NO, the flow returns to step STP7, in which the user operates the numeral key group 55, thus inputting a new numerical data greater or less than "138", and then goes to step STP8, in which the new contrast data is displayed in the new contrast presented by this new data. Steps STP7 and STP8 are repeated until the new contrast is optimal. If YES in step STP9, the interrupt key 52 is depressed in step STP10, whereupon the CPU 72 generates a data-rewriting signal. The data-rewriting signal is supplied to the memory 74, and the initial contrast data of "128" is erased from the memory 74, and new contrast data of "138" is written into the memory 74.

Then, in step STP11, the copying machine 2 is set to the test mode again, and the message "TEST MODE" is automatically displayed in the message-displaying section 50b of the LCD 50 as is shown in FIG. 5A. Needless to say, this message is displayed in the contrast which the user think is the best possible. Note that the copying machine 2 returns from the test mode to the operable or ready mode by turning off the power switch once.

As has been described above, the apparatus according to the present invention is easily adjustable in the image contrast of the LCD of the machine, i.e., the ratio in brightness of the displayed characters and graphics to the background of the LCD. This is because the contrast data determining the image contrast of the LCD stored in the memory can be replaced by any new contrast data input by operating the keys of the console panel unit.

Hence, the user need not remove a cover whatever to adjust the image contrast as is necessary in the case where the variable resistor for adjusting the image contrast of the LCD is located within the housing of the copying machine. As a result, the time for removing and attaching such a cover is saved, and the risk of damaging or staining such a cover is eliminated.

Moreover, since the LCD displays both the contrast data stored in the memory and the new contrast data input by operating the numeral key group, the user can easily know the difference between these data and can therefore adjust the image contrast of the LCD to the best possible value. When it is required of a person to adjust the image contrasts of the LCDs of several copying machines, he or she can set them to the same value.

In addition, since it suffices for such a person to operate the numeral key group to adjust the image contrast of the LCD, he or she is not exposed to the danger of suffering from electric shock.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for adjusting the image contrast of a display device capable of displaying data of a first and second brightness ratio of the display to a background thereof, the display device including a first display section for displaying data, a second display section for displaying the first brightness ratio and a third display section for displaying the second brightness ratio, said apparatus comprising:

means for energizing the display device which displays information, including the data, in the first brightness ratio;

means for inputting new data indicating the second brightness ratio for altering the first brightness ratio, the inputting means including a mode-switching element for switching the apparatus from a normal mode to a data-inputting mode, and a plurality of numeral-entry elements for directing the entry of numerical data;

means for supplying a first data indicating the first brightness ratio and the new data indicating the second brightness ratio until further data for changing the second data is inputted and the displayed information is changed, the data displayed in the third display section being replaced with the new data in response to entry of this new data; and means for changing a background brightness of the display based on the new data by controlling energizing means.

2. The apparatus according to claim 1, wherein said energizing means includes a D/A converter.

3. The apparatus according to claim 1 wherein the display device includes a dot-matrix LCD.

4. The apparatus according to claim 1 wherein said input means is formed integrally with the display device.

5. The apparatus according to claim 1, wherein the energizer means is a D/A converter, which produces a desirable analog voltage on the basis of the numerical data entered through the numeral-entry elements.

6. The apparatus according to claim 1, wherein the numerical data has a value corresponding to the resolution of the D/A converter.

7. A method of adjusting the image contrast of a display device capable of displaying data of first and second brightness ratios against a background thereof, said method using an apparatus for adjusting an image brightness of said display device and comprising the steps of:

a) setting the apparatus to a contrast-adjusting mode in response to a first signal inputted from an input means;

b) causing the display device to display first data stored in a memory means;

c) setting the apparatus to a data-inputted mode in response to a second signal, different from the first signal, inputted from the input means;

d) inputting second data from the input means;

e) causing the display device to display the second data inputted from the input means, and altering drive signals in accordance with the second data;

f) replacing the first data in the memory means with the second data;

g) setting the apparatus to the contrast-adjusting mode again; and h) releasing the apparatus from the contrast-adjusting mode.

8. An image forming apparatus comprising:

means for forming an image corresponding to an original on an image bearing member;

means for displaying information in accordance with an image forming operation by the image forming means, including a first display section for displaying the information, a second display section for displaying data indicating the first brightness ratio, and a third display section for displaying new data indicating the second brightness ratio;

means for energizing the displaying means;

means, including a mode-switching element for switching the apparatus from a normal mode to a data-inputting mode and a plurality of numeral-entry elements for directing entry of the new data, for inputting a plurality of image forming conditions;

means for supplying a first data indicating the first brightness ratio and the new data indicating the second brightness ratio until further data for changing the second data is inputted and the displayed information is changed, the data displayed in the third display section being replaced with the new data in response to entry of this new data; and means for changing a background brightness of the display means based on the entry new data.

9. The apparatus of claim 8, wherein the means for supplying first and second data is a keyboard, located on the exterior of the apparatus.

* * * * *